United States Patent
Horie et al.

(10) Patent No.: US 8,035,239 B2
(45) Date of Patent: Oct. 11, 2011

(54) COGENERATION SYSTEM

(75) Inventors: Ariko Horie, Saitama (JP); Yoshinori Nakagawa, Saitama (JP); Tsutomu Wakitani, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 499 days.

(21) Appl. No.: 12/321,518

(22) Filed: Jan. 22, 2009

(65) Prior Publication Data
US 2009/0206600 A1   Aug. 20, 2009

(30) Foreign Application Priority Data
Feb. 15, 2008 (JP) ............................... 2008-034507

(51) Int. Cl.
*B60L 1/02* (2006.01)
(52) U.S. Cl. .......................................................... 290/2
(58) Field of Classification Search ................. 237/12.3
See application file for complete search history.

(56) References Cited

U.S. PATENT DOCUMENTS

| | | | | |
|---|---|---|---|---|
| 4,527,071 A | * | 7/1985 | Ausiello | 290/4 R |
| 4,752,697 A | * | 6/1988 | Lyons et al. | 290/2 |
| 6,463,738 B1 | * | 10/2002 | Pinkerton et al. | 60/646 |
| 6,966,185 B2 | * | 11/2005 | Shimada et al. | 60/698 |
| 7,459,799 B2 | * | 12/2008 | Aldridge et al. | 290/2 |
| 2005/0062289 A1 | * | 3/2005 | Cho et al. | 290/2 |

FOREIGN PATENT DOCUMENTS
JP      2002-215228 A      7/2002
* cited by examiner

*Primary Examiner* — Michael Zarroli
(74) *Attorney, Agent, or Firm* — Carrier Blackman & Associates, P.C.; Joseph P. Carrier; William D. Blackman

(57) ABSTRACT

In a cogeneration system having a power plant that includes a generator and an internal combustion engine for driving the generator such that exhaust heat of the engine is supplied to a thermal load, there are provided a battery, a controller that controls operation of the thermal load, a main switch disposed to be operable by an operator, a microprocessor that controls operation of the power plant when the main switch is turned on by the operator, and an external terminal adapted to transmit an activation signal to the controller upon manipulation by the operator when the main switch is kept off. In the system, the microprocessor is operated by power supplied from the battery in response to the activation signal so as to activate the power plant. With this, even when the operator stays at a place away from the main switch, the power plant can be activated to supply power to electrical loads.

10 Claims, 6 Drawing Sheets

COGENERATION SYSTEM

BACKGROUND OF THE INVENTION

1. Field of the Invention

This invention relates to a cogeneration system, particularly to a cogeneration system that is activated in response to an activation signal transmitted from an external terminal such as a mobile phone.

2. Description of the Related Art

In recent years, cogeneration systems have been developed that are equipped with a power generation plant or power plant having a generator connectable to an AC power supply line between a commercial power network and an electrical load and an internal combustion engine for driving the generator, for supplying power to the load in interconnection with the power network and also for supplying hot water or air heated using exhaust heat from the engine to a thermal load. Such a cogeneration system is taught, for example, by Japanese Laid-Open Patent Application No. 2002-215228.

In the technique taught in the reference, operation supporting equipment (like a remote controller) is connected to the cogeneration system via the Internet. When an abnormality is detected based on information about the system operating condition transmitted from the system, the equipment changes operating condition of the system, or restarts the system or so.

SUMMARY OF THE INVENTION

Such a cogeneration system includes a microprocessor that controls the operation of the power plant, and the microprocessor is operated upon turning-on of a main switch by the operator and stopped upon turning-off thereof. Therefore, if a signal (activation signal) such as a restart signal, is transmitted from the operation supporting equipment, as disclosed in the reference, at the time when the main switch is kept off, the microprocessor in the stopped condition cannot receive the signal. As a result, the power plant is not activated disadvantageously, resulting in no power supply to an electrical load.

An object of this invention is therefore to overcome the foregoing problem by providing a cogeneration system that can activate a power plant in response to an activation signal transmitted from the outside even when a main switch is kept off.

In order to achieve the object, this invention provides in a first aspect a cogeneration system having a power plant that includes a generator connected to an AC power feed line between a power network and an electrical load and an internal combustion engine for driving the generator such that exhaust heat of the engine is supplied to a thermal load, comprising: a battery that stores DC power; a controller that controls operation of the thermal load; a main switch disposed to be operable by an operator; a microprocessor that controls operation of the power plant when the main switch is turned on by the operator; and an external terminal adapted to transmit an activation signal of the power plant to the controller upon manipulation by the operator when the main switch is kept off; wherein the microprocessor is adapted to be operated by power supplied from the battery in response to the activation signal received by the controller so as to activate the power plant.

In order to achieve the object, this invention provides in a second aspect a cogeneration system having a power plant that includes a generator connected to an AC power feed line between a power network and an electrical load and an internal combustion engine for driving the generator such that exhaust heat of the engine is supplied to a thermal load, comprising: a battery that stores DC power; a controller that controls operation of the thermal load; a main switch disposed to be operable by an operator; a main microprocessor that controls operation of the power plant when the main switch is turned on by the operator; an external terminal adapted to transmit an activation signal of the power plant to the controller upon manipulation by the operator when the main switch is kept off; and a sub-microprocessor adapted to be operated by power supplied from the battery in response to the activation signal received by the controller so as to operate the main microprocessor to activate the power plant.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A cogeneration system according to an embodiment of the invention will now be explained with reference to the attached drawings.

Figure 1:
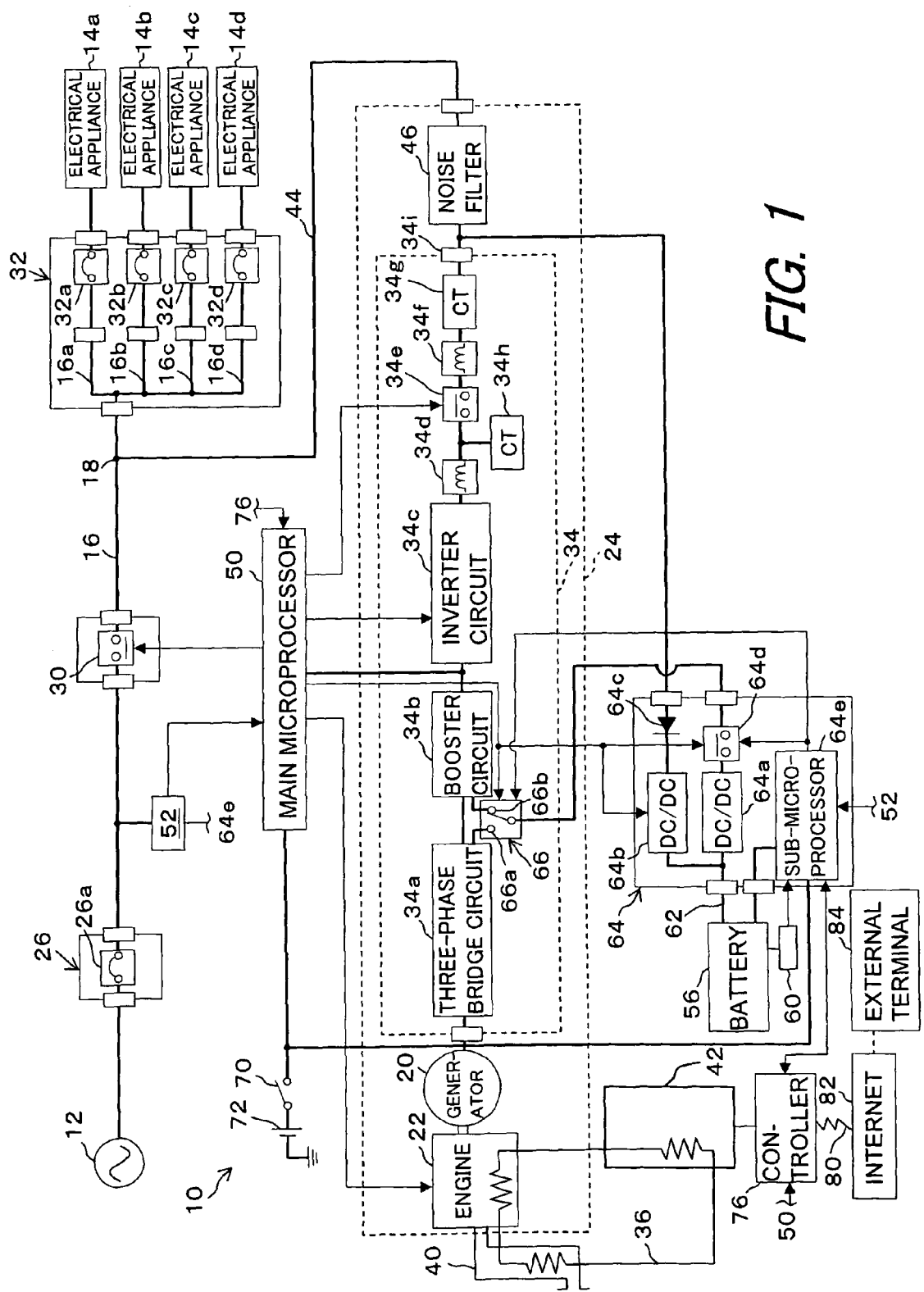
FIG. 1 is a block diagram giving an overall view of a cogeneration system according to an embodiment of this invention.

FIG. 1 is a block diagram giving an overall view of a cogeneration system according to the embodiment of this invention.

In FIG. 1, reference numeral 10 designates the cogeneration system. The cogeneration system 10 is equipped with a power plant 24 having a generator 20 connectable through a connection point 18 to an AC power feed line (power line; first feed line) 16 between a commercial power network (network power source) 12 and electrical load 14 and an internal combustion engine (ENG; hereinafter called "engine") 22 driving the generator 20. The power network 12 outputs or generates single-phase, three-wire, 100/200 V, 50 Hz (or 60 Hz) AC power.

The power plant 24 has a relatively low power output as explained later, and is targeted to the use in an individual residence and the like. The electrical load 14 comprises a plurality of, specifically four electrical AC appliances 14a, 14b, 14c, 14d. Typically, 14a and 14b might be lighting fixtures, 14c a washing machine, and 14d a refrigerator.

The first feed line 16 is installed with, in order from the power network 12 side (upstream side), a main breaker box 26, a first switch 30 and a circuit breaker panel 32. The first feed line 16 is connected to the electrical load 14 downstream of the panel 32. A main breaker 26a for overcurrent protection is installed in the main breaker box 26.

The first switch 30 is installed in the first feed line 16 at a location upstream (on the power network 12 side) of the connection 18 with the power plant 24. When the first switch 30 is turned on, the power network 12 is connected with the electrical load 14 and the power plant 24. When it is turned off, the connection with the electrical load 14 and the like is broken, thereby preventing supply (reverse flow) of power from the power plant 24 to the power network 12. Under ordinary circumstances (when there has been no outage of the power network 12), the first switch 30 is kept on.

The first feed line 16 is divided into four branch lines 16a, 16b, 16c, 16d at the circuit breaker panel 32, and the four branches are connected with the electrical appliances (load) 14a, 14b, 14c, 14d through associated breakers 32a, 32b, 32c, 32d. Like the aforesaid main breaker 26a, the breakers 32a to 32d open when the current exceeds predetermined values, thereby preventing the overcurrent from reaching the electrical load 14. As illustrated in FIG. 1, electrical connection with the main breaker box 26, first switch 30, circuit breaker panel 32 and the like is established through terminals (indicated by small boxes), which will not be described in detail.

The power plant 24 includes, in addition to the engine 22 and generator 20, an inverter 34 connected to the generator 20.

The units making up the power plant 24 will now be explained.

The engine 22 is a single-cylinder, four-cycle, water-cooled, spark-ignition, OHV engine that runs on city gas or LP (liquefied petroleum) gas and has a displacement of, for example, 163 cc. A coolant passage (not shown) of the engine 22 is connected to piping 36 that passes through the interior of a muffler 40 of the engine 22 and then into an air-conditioner (i.e., a hot air heater or thermal load) 42. The coolant of the engine 22 flows through the piping 36.

The coolant heated by operation of the engine 22 is further heated by the exhaust gas while passing through the muffler 40 and is then sent to the air-conditioner 42 where it raises the temperature of the air sucked in from a blower (not shown) by heat exchange. Thus the air-conditioner 42 is supplied with exhaust heat of the engine 22. The coolant cooled by the heat exchange is returned to the coolant passage to cool the engine 22. The hot air produced by the air-conditioner 42 flows through a hot air passage (not shown) into a room(s) to warm it up.

The generator 20 comprises a three-phase AC generator that produces an AC power output when its rotor (not shown) is driven by the engine 22 which is controlled to operate at a predetermined engine speed. The generator 20 is designed to have a maximum power output of, say, 1.0 kW.

The generator 20 also functions as a starter for the engine 22. The starting operation is conducted by supplying current from a battery (explained later) or the power network 12 to the stator coil (not shown) of the generator 20 so as to rotate its rotor, which is connected to the engine 22, and thereby cranking and starting the engine 22. The generator 20 is thus a starter-generator that functions both as a starter for the engine 22 and as a generator (alternator) that outputs AC power.

The inverter 34 is equipped with a three-phase bridge circuit (drive circuit) 34a that converts the AC output of the generator 20 to a DC output, a booster circuit 34b that boosts or steps up the voltage of the DC power rectified by the three-phase bridge circuit 34a to a predetermined voltage, and an inverter circuit 34c that inverts the boosted DC power to AC, i.e., inverts it to single-phase, three-wire, 100/200 V AC power of the same frequency as that of the power supplied by the power network 12. The inverter circuit 34c is equipped with multiple switching elements constituted of insulated-gate bipolar transistors (IGBTs) whose switching action inverts DC to AC.

The inverter 34 is further equipped with a choke coil 34d that removes noise from the inverter circuit output, a second switch 34e, a common-mode coil 34f that removes noise from the second switch output, and a current sensor (current transformer (CT)) 34g that detects the current, i.e., the amperage of the common-mode coil output.

When the second switch 34e is turned on, the inverter circuit output is supplied to the electrical load 14, and when it is turned off, supply of the output to the load 14 is cut off. A second current sensor 34h is connected between the choke coil 34d and the second switch 34e and produces an output indicating the amperage of the AC current at that point.

The inverter 34 is connected to the first feed line 16 through a second feed line 44 and the connection 18. The AC power outputted by the inverter 34 is therefore supplied to the electrical appliances (load) 14a, 14b, 14c, 14d through the second feed line 44, connection 18, first feed line 16 and circuit breaker panel 32 (breakers 32a to 32d). A noise filter 46 is interposed between the inverter 34 and the second feed line 44 for removing noise from the output of the inverter 34.

The cogeneration system 10 is further equipped with a main microprocessor 50 that controls the power plant 24 and the like, and a current-voltage sensor 52 connected to the first feed line 16. The current-voltage sensor 52 produces outputs or signals representing the voltage, current and phase (sine wave) of the AC power on the first feed line 16 and sends the outputs to the main microprocessor 50 and the like.

Based on the outputs of the current-voltage sensor 52, the main microprocessor 50 detects or determines whether or not the power network 12 supplies AC power through the first feed line 16, i.e., whether it operates normally or has experienced a power outage, and when it discriminates that the power network 12 does not supply AC power (i.e., an outage has occurred), turns the first switch 30 off to prevent reverse flow.

Also, when the power plant 24 is operated while the power network 12 supplies AC power, the main microprocessor 50 detects a phase of the power network 12 and the like and based on the detected value and the like, controls the operation of the inverter circuit 34c and other system elements to drive the generator 20 in synchronism with the power network 12.

In addition to the power plant 24, the cogeneration system 10 has the battery (now assigned by 56) that stores DC power, a battery sensor 60 that produces an output or signal indicative of voltage of the battery 56 and a DC/DC converter unit 64 that is connected to the battery 56 through a power line 62 to step up the voltage from the battery 56.

The battery 56 is made up of a suitable number of nickel-metal hydride (Ni-MH) voltaic cells that is connected in series and stores, for example, 12V DC power. The DC/DC converter unit 64 is equipped with first and second DC/DC converters 64a, 64b that utilize the switching action of IGBTs (not shown) to step up/down the voltage of inputted power to a predetermined value, a diode 64c whose anode terminal is connected to the output side of the inverter 34 and whose cathode terminal is connected to the second DC/DC converter 64b, a third switch 64d, and a sub-microprocessor 64e that is inputted with a signal from the battery sensor 60 and controls the operation of the third switch 64d and the like.

Although, in general, the term "microprocessor" means a CPU, the main microprocessor 50 and sub-microprocessor 64e in this embodiment are used to mean each contains, in addition to the CPU, peripheral circuits such as an input/output circuit and a memory.

As illustrated, the battery 56 is connected to the first DC/DC converter 64a and sub-microprocessor 64e. The sub-microprocessor 64e is constantly supplied with operating power from the battery 56.

The output of the battery 56 is stepped up to the predetermined voltage by the first DC/DC converter 64a and sent to the third switch 64d. When the third switch 64d is turned on, the output of the battery 56 thus stepped up is supplied to a selector switch 66, and when it is turned off, the supply of the battery output is cut off. The selector switch 66 is configured to be switched between a first terminal 66a connected to the three-phase bridge circuit 34a and a second terminal 66b connected to the booster circuit 34b.

Therefore, when the third switch 64d of the DC/DC converter unit 64 is turned on, in the case where the selector switch 66 is switched to the first terminal 66a, the output of the battery 56 boosted by the first DC/DC converter 64a is supplied to the three-phase bridge circuit 34a of the inverter 34, while, in the case where the selector switch 66 is switched to the second terminal 66b, the battery output is supplied to the booster circuit 34b and, together with the power output of the generator 20, is finally supplied to the electrical load 14. Even in the case that the generator 20 is stopped, when the third switch 64d is turned on and the selector switch 66 is switched to the second terminal 66b, the battery 56 is connected through the booster circuit 34b to the main microprocessor 50 to supply operating power thereto.

The AC power outputted by the inverter 34 is converted to DC power by the diode 64c under a predetermined operating condition, sent to the second DC/DC converter 64b to be suitably lowered in voltage, and then supplied to the battery 56 to charge it.

The cogeneration system 10 is equipped with a main switch 70. The main microprocessor 50 and sub-microprocessor 64e are electrically connected via the main switch 70 to an operating power source 72 such as a battery, dry cell or the like. The main switch 70 is disposed to be operable by the operator and when turned on, supplies the output of the power source 72 to the main microprocessor 50 and sub-microprocessor 64e as operating power. Thus, when the main switch 70 is turned on by the operator, the main microprocessor 50 controls the operation of the power plant 24.

On the other hand, when the main switch 70 is turned off by the operator, power supply from the power source 72 is cut off and the operation of the main microprocessor 50 is stopped. However, since the sub-microprocessor 64e is supplied with operating power also from the battery 56 as mentioned above, its operation is not stopped even when the main switch 70 is turned off.

The air-conditioner 42 is equipped with a controller 76 that controls the operation of the air-conditioner 42. The controller 76 is a remote controller that can communicate with an inner controller (not shown) of the air-conditioner 42 through short-range wireless communication and is operated using power from a dry cell. The controller 76 installed in each room to be operable by the operator (user) is utilized for setting or inputting desired room temperature and the like. The controller 76 also comprises a microprocessor and, as illustrated, is connected to the Internet (Web; public telecommunication network) 82 through a communication line 80.

The Internet 82 can be connected with an external terminal 84 that is specifically a mobile phone or a computer (i.e., personal computer).

Figure 2:
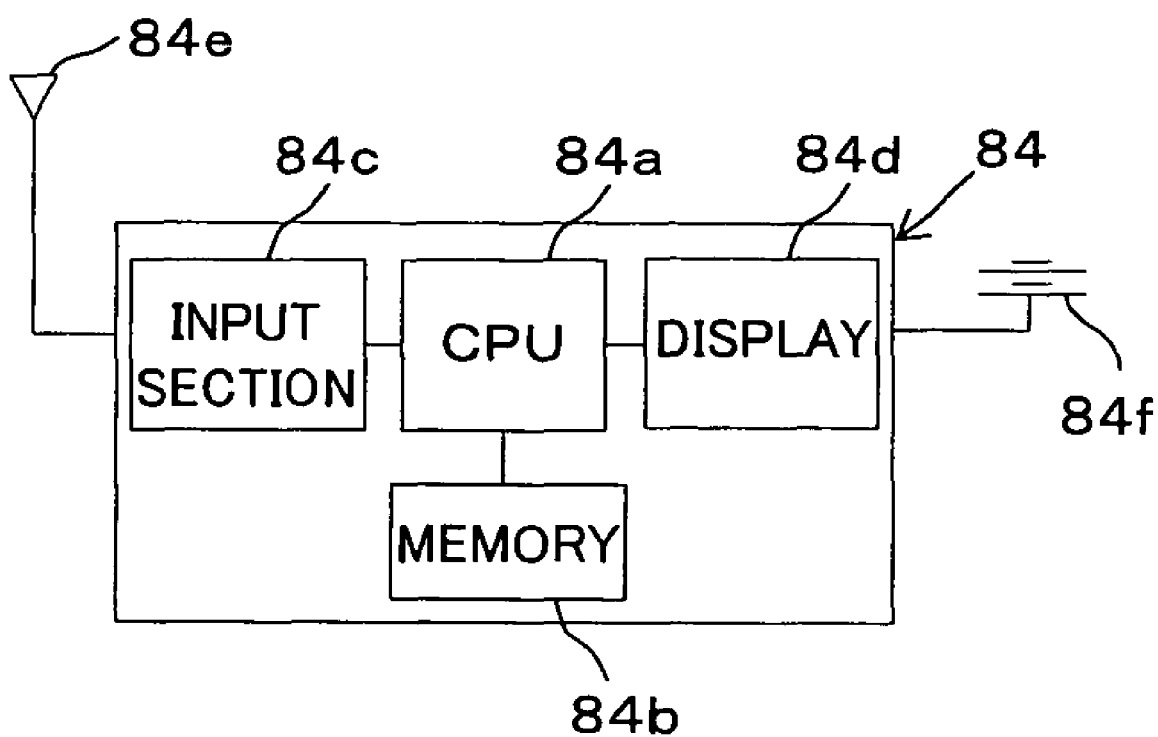
FIG. 2 is a block diagram showing the structure of an external terminal shown in FIG. 1.

FIG. 2 is a block diagram showing the structure of the external terminal 84 shown in FIG. 1.

As shown in FIG. 2, the external terminal 84 is equipped with a CPU 84a, a memory 84b, an input section 84c having a plurality of keys to be manipulated by the operator and other elements, a display 84d that displays information (i.e., information about the operating condition of the power plant 24 etc.) based on the signals transmitted from the controller 76 and the like for informing the operator, a transmitting and receiving antenna 84e that communicates with the controller 76 and the like through the Internet 82 to transmit and receive the signals, and an operating power source 84f. The memory 84b, input section 84c and display 84d are connected with each other through the CPU 84a to communicate with each other.

For example, under condition that the main switch 70 is kept off and the operation of the power plant 24 is stopped, when the operator stays at a place away from the main switch 70 and cannot directly manipulate, i.e., turn on the main switch 70 but still desires to activate the power plant 24, the operator operates the external terminal 84 to transmit a signal used for activating the power plant 24 to the controller 76.

Specifically, upon the manipulation of the input section 84c by the operator, the external terminal 84 makes a connection with the Internet 82 through the CPU 84a, transmitting and receiving antenna 84e and the like to access a specific website (not shown) on the Internet 82. When the operator operates the external terminal 84, an activation signal for activating the power plant 24 is transmitted to the controller 76 through the Internet 82. Thus, when the main switch 70 is kept off, the external terminal 84 transmits the activation signal for the power plant 24 to the controller 76 upon the manipulation by the operator.

Once receiving the activation signal, the controller 76 sends or transfers the received signal to the sub-microprocessor 64e, while producing a confirmation signal (explained later) and sending it to both the main microprocessor 50 and the sub-microprocessor 64e. The main microprocessor 50 and sub-microprocessor 64e activate the power plant 24 upon establishment of a predetermined condition such as receipt of the activation signal and the like. The external terminal 84 is transmitted via the Internet 82 with a signal, precisely, a signal indicative of the current operating condition of the power plant 24 (e.g., a signal indicating whether the power plant 24 has been activated or not), from the controller 76.

In other words, a signal indicative of the current operating condition of the power plant 24 is transmitted from the main microprocessor 50 or the sub-microprocessor 64e to the controller 76. Once receiving the signal, the controller 76 transmits or transfers it to the external terminal 84 via the Internet 82 by, for instance, using an electronic mail. The transmitted signal is sent to the display 84d through the transmitting and receiving antenna 84e and CPU 84a of the external terminal 84 and the like, and the display 84d displays the current operating condition of the power plant 24, e.g., displays an indication that the power plant 24 has been activated. Thus information on whether the power plant 24 has been activated or not is informed to the operator using the external terminal 84, so that the operator can recognize the activating status of the power plant 24.

Next, the processing for activating the power plant 24 using the activation signal from the external terminal 84 will be explained with reference to FIG. 3 onward.

Figure 3:
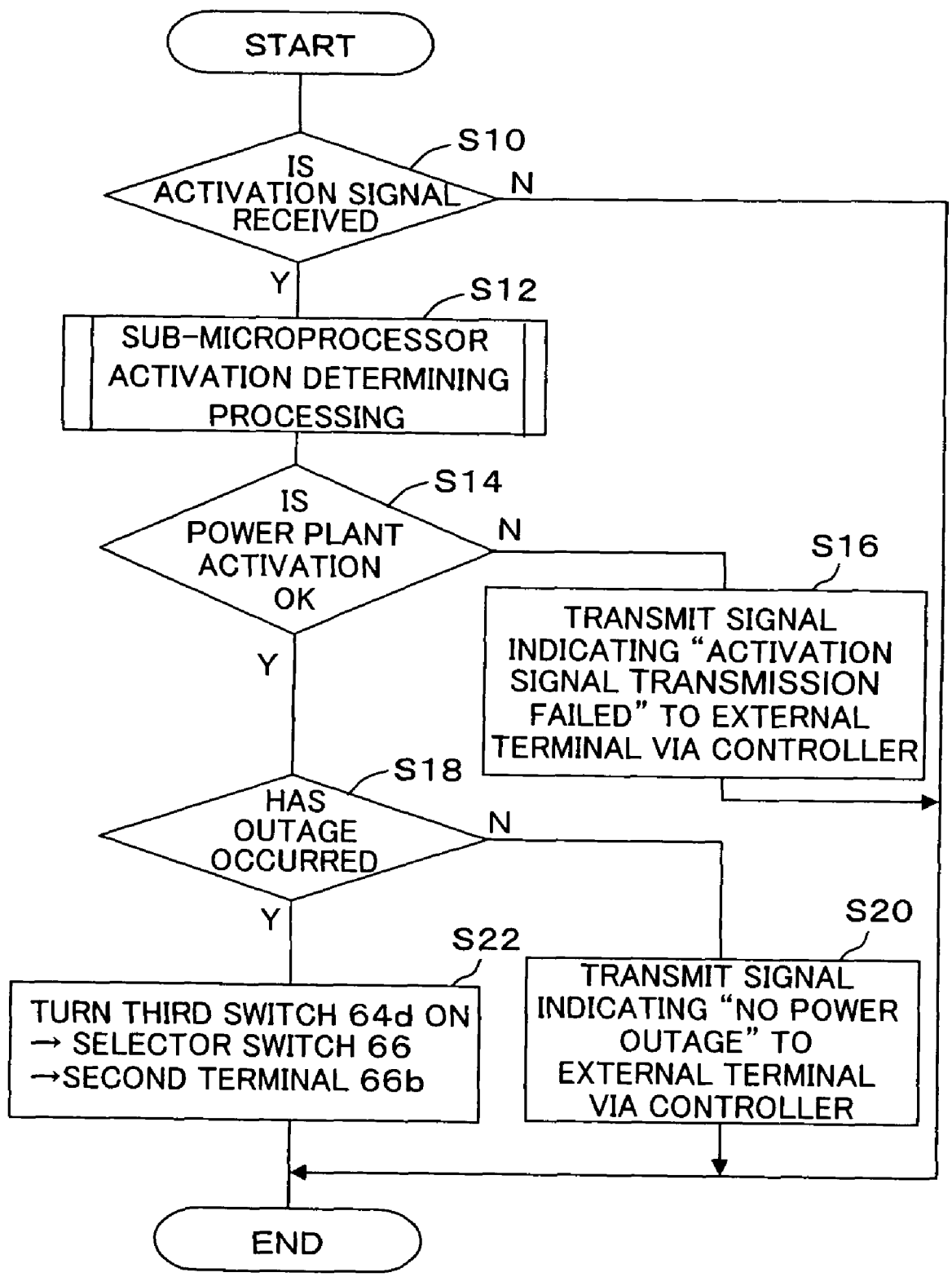
FIG. 3 is a flowchart showing the processing of a sub-microprocessor of a DC/DC converter unit shown in FIG. 1.

FIG. 3 is a flowchart showing the processing of the sub-microprocessor 64e of the DC/DC converter unit 64. The illustrated program is executed at a predetermined interval, e.g., 100 milliseconds. The processing of the program of FIG.

3 is the one for activating the power plant 24 in response to the activation signal transmitted from the external terminal 84 when the main switch 70 is kept off.

In S10, it is determined whether the activation signal transmitted from the external terminal 84 through the Internet 82 and controller 76 is received. When the result in S10 is No, the remaining steps are skipped and when the result is Yes, the program proceeds to S12, in which it is determined whether the power plant 24 is in a status that allows its activation (this processing is indicated as "sub-microprocessor activation determining processing" in FIG. 3).

Figure 4:
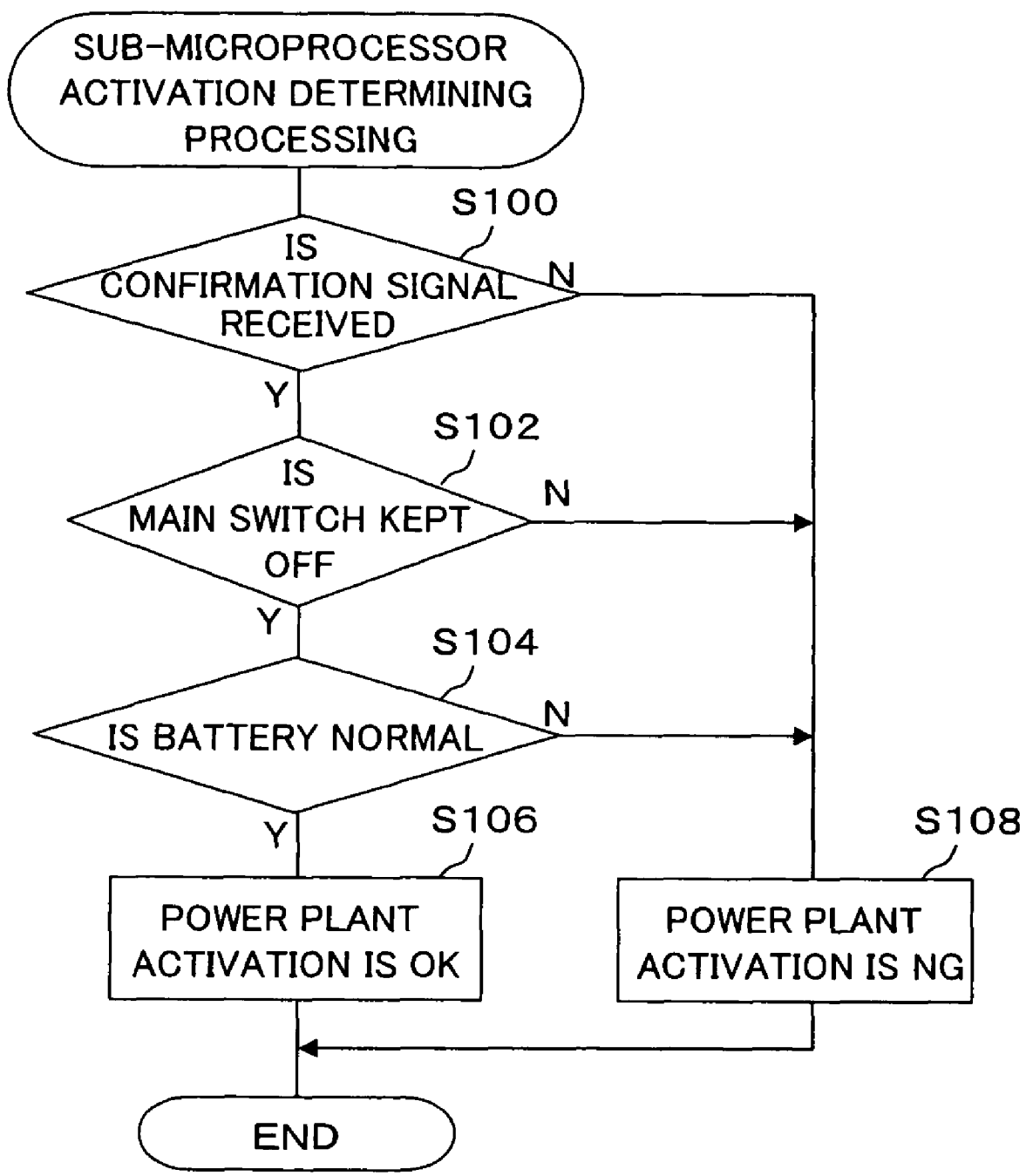
FIG. 4 is a subroutine flowchart showing, inter alia, activation determining processing of the sub-microprocessor in the flowchart of FIG. 3.

FIG. 4 is a subroutine flowchart showing the sub-microprocessor activation determining processing.

In S100, it is determined whether the confirmation signal is received from the controller 76. When the result in S100 is Yes, the program proceeds to S102, in which it is determined whether the main switch 70 is kept off based on the presence/absence of power supply from the operating power source 72.

When the result in S102 is Yes, it is determined in S104 whether the battery 56 is normal. This determination is made based on a value indicative of the voltage outputted from the battery sensor 60. Specifically, when the voltage is equal to or greater than a predetermined value, it is discriminated to be normal, while, when the voltage is lower than the predetermined value, it is discriminated to be abnormal, i.e., there occurs an abnormality such as capacity shortage or the like.

When the result in S104 is Yes, the program proceeds to S106, in which it is determined that the activation of the power plant 24 can be made (OK). On the other hand, when the result in one of the steps of S100 to S104 is No, it means that the confirmation signal is not received, the main switch 70 is in the on position, or an abnormality such as output shortage etc. occurs in the battery 56, so the program proceeds to S108, in which it is determined that the activation of the power plant 24 should not be made (NG).

The explanation of the flowchart of FIG. 3 is resumed. In S14, it is determined whether the activation of the power plant 24 is discriminated to be OK in S12. When the result in S14 is No, the program proceeds to S16, in which a signal indicating that transmission of the activation signal was failed is transmitted to the external terminal 84 through the controller 76 and Internet 82. Subsequently the display 84d of the external terminal 84 displays an indication that transmission of the activation signal was failed and the power plant 24 is not activated.

On the other hand, when the result in S14 is Yes, the program proceeds to S18, in which it is determined whether a power network outage has occurred, i.e., the power network 12 experiences a power outage. Specifically, when a signal indicative of expected AC power is outputted from the current-voltage sensor 52, the power network 12 is discriminated to be normal, while, when the signal is not outputted, it is discriminated that the power network outage has occurred.

When the result in S18 is No, the program proceeds to S20, in which a signal indicative of no power outage (in other words, indicating that it is not necessary to activate the power plant 24) is transmitted to the external terminal 84 through the controller 76 and Internet 82. Subsequently the display 84d of the external terminal 84 displays an indication that the power network 12 does not experience a power outage and the power plant 24 is not activated.

On the other hand, when the result in S18 is Yes, the program proceeds to S22, in which the third switch 64d is turned on and the selector switch 66 is switched to the second terminal 66b. As a result, the main microprocessor 50 is supplied with operating power to be activated or operated. Thus the sub-microprocessor 64e is operated by power supplied from the battery 56 in response to the activation signal received by the controller 76, thereby operating the main microprocessor 50 to activate the power plant 24.

Figure 5:
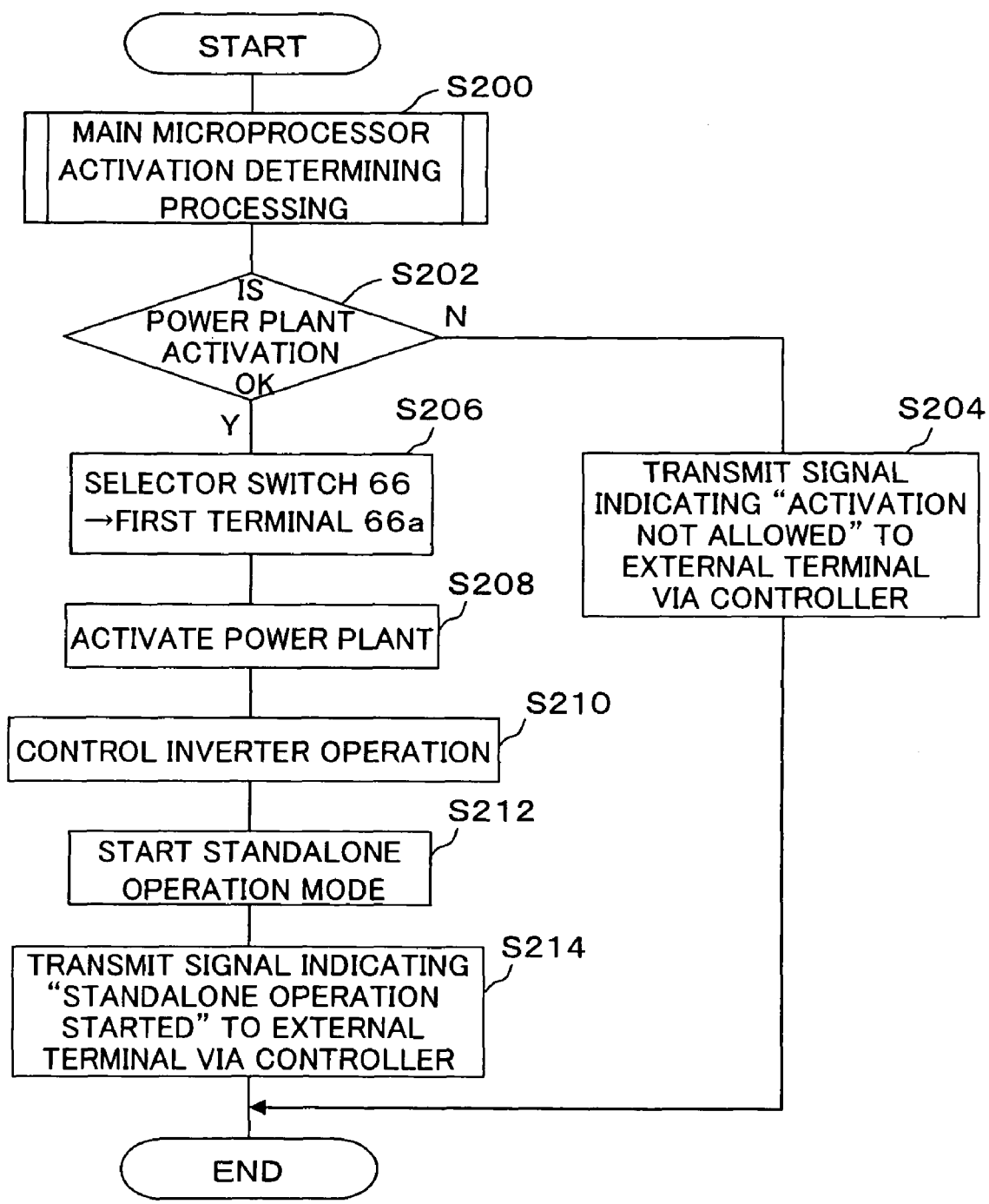
FIG. 5 is a flowchart showing the processing of a main microprocessor shown in FIG. 1.

FIG. 5 is a flowchart showing the processing of the main microprocessor 50 after starting by being supplied with operating power in the processing of S22 of FIG. 3 flowchart.

In S200, it is determined whether the power plant 24 is in a status that allows its activation (this processing is indicated as "main microprocessor activation determining processing" in FIG. 5).

Figure 6:
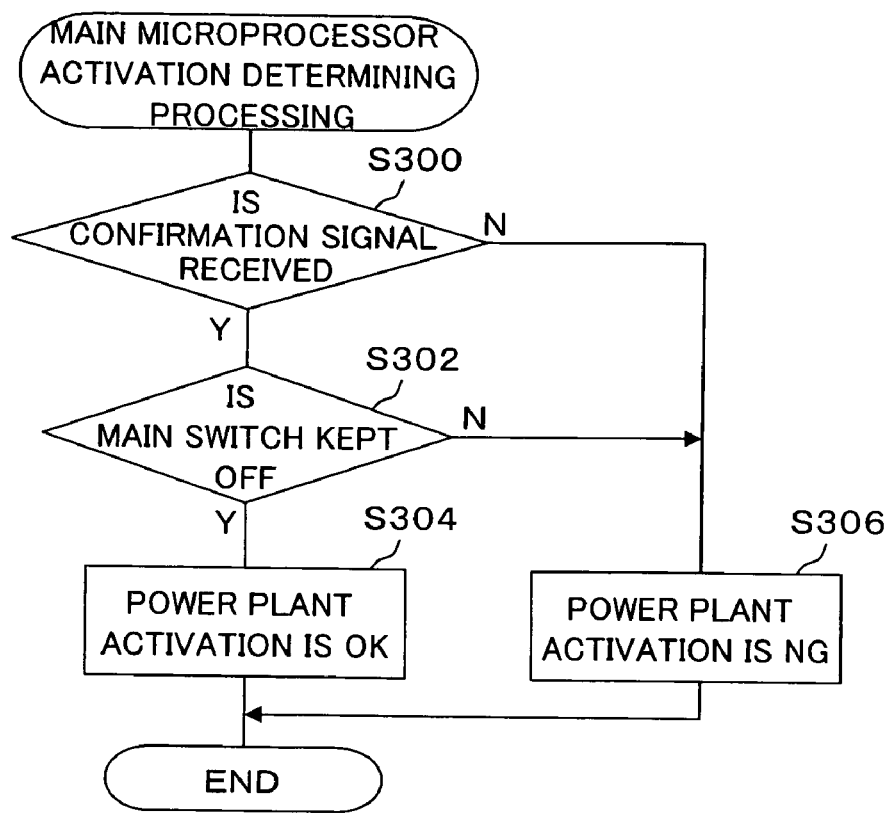
FIG. 6 is a subroutine flowchart showing, inter alia, the processing for determining activation of the main microprocessor in the flowchart of FIG. 5.

FIG. 6 is a subroutine flowchart showing the main microprocessor activation determining processing in S200 of the flowchart of FIG. 5.

In S300, it is determined whether the confirmation signal is received from the controller 76. When the result in S300 is Yes, the program proceeds to S302, in which it is determined whether the main switch 70 is kept off based on the presence/absence of power supply from the operating power source 72, similarly to S102.

When the result in S302 is Yes, in S304, it is determined that the power plant 24 is in a status that allows its activation and the activation of the power plant 24 can be made (OK). On the other hand, when the result in S300 or S302 is No, it means that the confirmation signal is not received or the main switch 70 is in the on position, so the program proceeds to S306, in which it is determined that the activation of the power plant 24 should not be made (NG).

The explanation of the flowchart of FIG. 5 is resumed. In S202, it is determined whether the determination of the power plant 24 activation made in S200 is proper (OK). When the result in S202 is No, the program proceeds to S204, in which a signal indicating that the activation is not allowed is transmitted to the external terminal 84 through the controller 76 and Internet 82. The display 84d of the external terminal 84 displays an indication that the activation is not allowed, i.e., the power plant 24 is not activated.

When the result in S202 is Yes, the program proceeds to S206, in which the selector switch 66 is switched to the first terminal 66a. Consequently the output of the DC/DC converter unit 64 (i.e., the output of the battery 56 boosted by the first DC/DC converter 64a) is supplied through the selector switch 66 and three-phase bridge circuit 34a to the stator coil of the generator 20 to rotate its rotor. Next in S208, the engine 22 is cranked and started with the rotation of the rotor, thereby starting or activating the power plant 24.

In S210, the operation of the inverter 34 is controlled and in S212, a standalone operation mode (specifically, the control mode which controls the cogeneration system 10 to operate independently without interconnection with the power network 12 when, for example, the power network 12 outage occurs) is started. Then in S214, a signal indicating that the standalone operation mode started is transmitted to the external terminal 84 through the controller 76 and Internet 82. As a result, the display 84d of the external terminal 84 displays an indication that the activation signal was transmitted and the power plant 24 has been activated.

The explanation will be made on the processing for stopping the operation of the power plant 24 that was activated as explained above.

Figure 7:
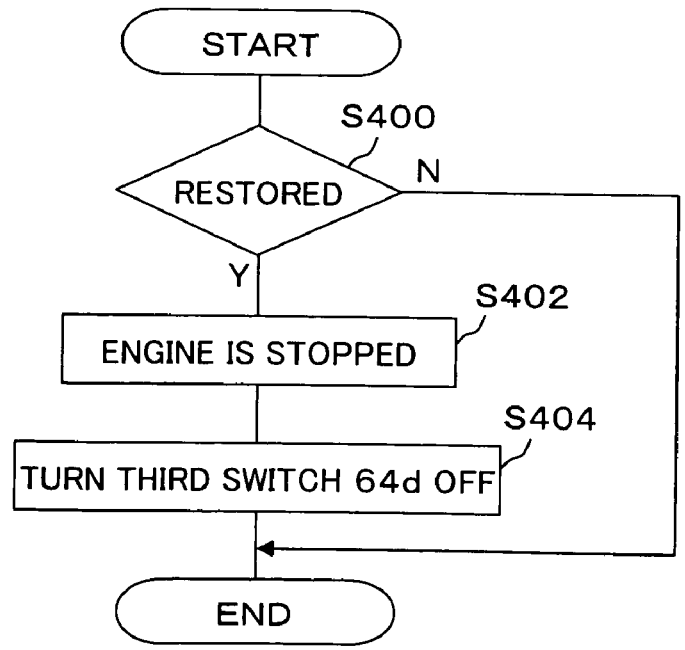
FIG. 7 is a flowchart showing the processing for stopping a power plant among the operation of the main microprocessor shown in FIG. 1.

FIG. 7 is a flowchart showing the processing of the main microprocessor 50. The illustrated program is executed at a predetermined interval, e.g., 100 milliseconds.

In S400, it is determined whether the power network 12 is restored, i.e., the power outage has ended. This determination is also made based on the output of the current-voltage sensor 52. When the result in S400 is No, since it is necessary to keep the power plant 24 operating, the remaining steps are skipped.

When the result is Yes, the program proceeds to S402, in which the engine 22 is stopped by, for instance, terminating the ignition. The program proceeds to S404, in which the third switch 64d is turned off to discontinue power supply from the battery 56 to the main microprocessor 50 and stops the processing. As a result, power from the power network 12 is supplied to the electrical appliances 14a, 14b, 14c, 14d and the operating condition is returned back to the normal state.

Although in the foregoing it is configured such that restoration of the power network 12 (end of the power outage) leads to stoppage of the cogeneration system 10 (precisely, the power plant 24) which was activated with the activation signal from the external terminal 84, it should not limited thereto. Regardless of the power outage or restoration of the power network 12, the operation of the cogeneration system 10 can be stopped by, for instance, turning on the main switch 70 by the operator who has approached the main switch 70 from a place away therefrom.

As stated in the foregoing, the embodiment is configured to have a cogeneration system (10) having a power plant (24) that includes a generator (20) connected to an AC power feed line (16) between a power network (12) and an electrical load (14 (14a to 14d)) and an internal combustion engine (22) for driving the generator such that exhaust heat of the engine is supplied to a thermal load (air-conditioner 42), comprising: a battery (56) that stores DC power; a controller (76) that controls operation of the thermal load; a main switch (70) disposed to be operable by an operator; a microprocessor (main microprocessor 50) that controls operation of the power plant when the main switch is turned on by the operator; and an external terminal (84) adapted to transmit an activation signal of the power plant 24 to the controller upon manipulation by the operator when the main switch 70 is kept off; wherein the microprocessor 50 is adapted to be operated by power supplied from the battery in response to the activation signal received by the controller so as to activate the power plant 24.

More specifically, the embodiment is configured to have a cogeneration system (10) having a power plant (24) that includes a generator (20) connected to an AC power feed line (16) between a power network (12) and an electrical load (14) and an internal combustion engine (22) for driving the generator such that exhaust heat of the engine is supplied to a thermal load (air-conditioner 42), comprising: a battery (56) that stores DC power; a controller (76) that controls operation of the thermal load; a main switch (70) disposed to be operable by an operator; a main microprocessor (50) that controls operation of the power plant when the main switch is turned on by the operator; an external terminal (84) adapted to transmit an activation signal of the power plant 24 to the controller upon manipulation by the operator when the main switch 70 is kept off; and a sub-microprocessor (64e) adapted to be operated by power supplied from the battery in response to the activation signal received by the controller so as to operate the main microprocessor to activate the power plant 24.

With this, under condition that the main switch 70 is kept off and the operation of the power plant 24 is stopped, even when the operator stays at a place away from the main switch 70 and cannot directly manipulate, i.e., turn on the main switch 70, the power plant 24 can be activated by transmitting the activation signal from the external terminal 84 to the controller 76, thereby enabling to supply power to the electrical load (electrical appliances 14a, 14b, 14c, 14d).

Further the system is configured such that, the controller 76 is connected to Internet (82) and the external terminal 84 transmits the activation signal to the controller through the Internet. With this, the external terminal 84 can transmit the activation signal to the controller 76 easily and reliably.

Further the system is configured such that, the external terminal 84 is at least one of a mobile phone and a computer (i.e., a personal computer). With this, it is not necessary to newly employ another device as the external terminal 84 for transmitting the activation signal, thereby achieving the simple structure.

Further, the system is configured to further include: an information supplier that informs the operator using the external terminal 84, more specifically its display 84d whether the power plant 24 has been activated or not (main microprocessor 50; sub-microprocessor 64e; S16, S20, S204, S214). With this, the operator can surely recognize the current operating condition of the power plant 24, i.e., whether the power plant 24 has been activated or not.

Further, the system is configured such that, the main and sub-microprocessors 50, 64e each includes a CPU, a peripheral circuit and a memory. With this, it is not necessary to newly employ another device, thereby achieving the simple structure.

It should be noted that, although, in the foregoing, the engine 22 is started and the power plant 24 is activated when the power network 12 outage is detected, the power plant 24 instead can be activated based on a status of use of the electrical load 14 or the thermal load (air-conditioner) 42.

It should also be noted that although the external terminal 84 and controller 76 are connected through the Internet 82, they can be connected simply by radio.

It should also be noted that, instead of a gas engine using gas fuel such as the city gas or LP (liquefied petroleum) gas exemplified as the power source of the generator 20, it can be an engine using gasoline fuel or the like. Further, although the output of the generator 20, displacement of the engine 22 and the like are shown by specific values, they are only examples and not limited thereto.

It should yet still be noted that although the embodiment set out in the foregoing is explained as using AC power of 100/200 V outputted by the power network 12, it goes without saying that if the voltage of the AC power outputted by the power network exceeds 100/200 V, the power plant 24 is configured to produce an output of corresponding voltage.

Japanese Patent Application No. 2008-034507 filed on Feb. 15, 2008, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A cogeneration system having a power plant that includes a generator connected to an AC power feed line between a power network and an electrical load and an internal combustion engine for driving the generator such that exhaust heat of the engine is supplied to a thermal load, comprising:
a battery that stores DC power;
a controller that controls operation of the thermal load;
a main switch disposed to be operable by an operator;
a microprocessor that controls operation of the power plant when the main switch is turned on by the operator; and
an external terminal adapted to transmit an activation signal of the power plant to the controller upon manipulation by the operator when the main switch is kept off,
wherein the microprocessor is adapted to be operated by power supplied from the battery in response to the activation signal received by the controller so as to activate the power plant.

2. The system according to claim 1, wherein the controller is connected to Internet and the external terminal transmits the activation signal to the controller through the Internet.

3. The system according to claim 1, wherein the external terminal is at least one of a mobile phone and a computer.

4. The system according to claim 1, further including:
an information supplier that informs the operator using the external terminal whether the power plant has been activated or not.

5. The system according to claim 1, wherein the microprocessor includes a CPU, a peripheral circuit and a memory.

6. A cogeneration system having a power plant that includes a generator connected to an AC power feed line between a power network and an electrical load and an internal combustion engine for driving the generator such that exhaust heat of the engine is supplied to a thermal load, comprising:
a battery that stores DC power;
a controller that controls operation of the thermal load;
a main switch disposed to be operable by an operator;
a main microprocessor that controls operation of the power plant when the main switch is turned on by the operator;
an external terminal adapted to transmit an activation signal of the power plant to the controller upon manipulation by the operator when the main switch is kept off; and
a sub-microprocessor adapted to be operated by power supplied from the battery in response to the activation signal received by the controller so as to operate the main microprocessor to activate the power plant.

7. The system according to claim 6, wherein the controller is connected to Internet and the external terminal transmits the activation signal to the controller through the Internet.

8. The system according to claim 6, wherein the external terminal is at least one of a mobile phone and a computer.

9. The system according to claim 6, further including:
an information supplier that informs the operator using the external terminal whether the power plant has been activated or not.

10. The system according to claim 6, wherein the main microprocessor and the sub-microprocessor each includes a CPU, a peripheral circuit and a memory.

* * * * *